United States Patent
Kim et al.

(10) Patent No.: US 11,319,394 B2
(45) Date of Patent: May 3, 2022

(54) BOTH TERMINAL-MODIFIED CONJUGATED DIENE-BASED POLYMER AND METHOD FOR PREPARING THE SAME

(71) Applicant: LG Chem, Ltd., Seoul (KR)

(72) Inventors: Min Soo Kim, Daejeon (KR); Soo Yong Lee, Daejeon (KR); Won Mun Choi, Daejeon (KR)

(73) Assignee: LG Chem, Ltd.

( * ) Notice: Subject to any disclaimer, the term of this patent is extended or adjusted under 35 U.S.C. 154(b) by 426 days.

(21) Appl. No.: 16/345,793

(22) PCT Filed: Sep. 3, 2018

(86) PCT No.: PCT/KR2018/010238
§ 371 (c)(1),
(2) Date: Apr. 29, 2019

(87) PCT Pub. No.: WO2019/066279
PCT Pub. Date: Apr. 4, 2019

(65) Prior Publication Data
US 2019/0263956 A1   Aug. 29, 2019

(30) Foreign Application Priority Data

Sep. 29, 2017 (KR) .................. 10-2017-0126961
Jul. 13, 2018 (KR) .................. 10-2018-0081572

(51) Int. Cl.
| C08F 236/14 | (2006.01) |
| C08K 3/36 | (2006.01) |
| C08K 3/04 | (2006.01) |
| C08C 19/22 | (2006.01) |
| C08F 236/10 | (2006.01) |
| C08C 19/25 | (2006.01) |
| C08C 19/44 | (2006.01) |

(52) U.S. Cl.
CPC ............ *C08F 236/14* (2013.01); *C08C 19/22* (2013.01); *C08C 19/25* (2013.01); *C08C 19/44* (2013.01); *C08F 236/10* (2013.01); *C08K 3/04* (2013.01); *C08K 3/36* (2013.01)

(58) Field of Classification Search
CPC ............ C08F 236/14; C08K 3/04; C08K 3/36
See application file for complete search history.

(56) References Cited

U.S. PATENT DOCUMENTS

| 4,397,994 | A | 8/1983 | Takeuchi et al. |
| 9,822,192 | B2 * | 11/2017 | Choi ................. C08C 19/22 |
| 9,951,150 | B2 * | 4/2018 | Choi ................. C08C 19/26 |
| 10,030,079 | B2 * | 7/2018 | Lee .................. C08K 3/013 |
| 10,351,635 | B2 * | 7/2019 | Choi ................. C08C 19/44 |
| 11,066,487 | B2 * | 7/2021 | Lee .................. C08C 19/44 |
| 2012/0136128 | A1 | 5/2012 | Yan et al. |
| 2014/0371383 | A1 | 12/2014 | Hayata et al. |
| 2016/0347877 | A1 | 12/2016 | Lee et al. |
| 2018/0072821 | A1 | 3/2018 | Janowski et al. |

FOREIGN PATENT DOCUMENTS

| CN | 103764682 A | 4/2014 |
| CN | 107743498 A | 2/2018 |
| KR | 20120046721 A | 5/2012 |
| KR | 20140028133 A | 3/2014 |
| KR | 20160065733 A | 6/2016 |
| KR | 20160079323 A | 7/2016 |
| KR | 20170075662 A | 7/2017 |
| WO | 2016104987 A1 | 6/2016 |
| WO | 2016162482 A1 | 10/2016 |

OTHER PUBLICATIONS

Search report from International Application No. PCT/KR2018/010238, dated Dec. 10, 2018.
Chinese Search Report for Application No. 201880021507.1 dated Jul. 30, 2021, 2 Pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

A both terminal-modified conjugated diene-based polymer, which includes a functional group derived from a modification polymerization initiator and a functional group derived from a modifier, and has excellent affinity with a filler and improved mechanical properties and viscoelasticity properties, and a method for preparing the same.

19 Claims, No Drawings

BOTH TERMINAL-MODIFIED CONJUGATED DIENE-BASED POLYMER AND METHOD FOR PREPARING THE SAME

CROSS-REFERENCE TO RELATED APPLICATIONS

This application is a national phase entry under 35 U.S.C. § 371 of International Application No. PCT/KR2018/010238, filed Sep. 3, 2018, which claims priority to Korean Patent Application Nos. 10-2017-0126961, filed Sep. 29, 2017, and Korean Patent Application No. 10-2018-0081572, filed Jul. 13, 2018, the disclosures of which are incorporated herein by reference.

TECHNICAL FIELD

The present invention relates to a both terminal-modified conjugated diene-based polymer, which includes a functional group derived from a modification polymerization initiator and a functional group derived from a modifier, and has excellent affinity with a filler and improved mechanical properties and viscoelasticity properties, and a method for preparing the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires.

Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR rubber prepared by the solution polymerization is widely used as a rubber material for tires because it is easy to change a structure of the finally prepared SBR or BR rubber, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as rolling resistance and braking force, required for tires may be controlled, and fuel consumption may also be reduced by appropriately adjusting the glass transition temperature.

Therefore, as a method for increasing the dispersibility of SBR with a filler such as silica and carbon black, a method for modifying the polymerization active part of a conjugated diene-based polymer that is obtained by an anionic polymerization using an organolithium to a functional group which is capable of interacting with a filler has been suggested. For example, a method of modifying to a tin-based compound, a method of introducing an amine group, a method of modifying to an alkoxysilane derivative, etc., with respect to the polymerization active terminal of a conjugated diene-based polymer, have been suggested.

For example, U.S. Pat. No. 4,397,994 discloses a method of coupling active anions at the terminal of a polymer chain obtained by polymerizing styrene-butadiene using alkyllithium which is a monofunctional initiator in a non-polar solvent, using a binder such as a tin compound.

Meanwhile, carbon black and silica are used as a reinforcing filler of a tire tread, wherein, if the silica is used as the reinforcing filler, low hysteresis loss and wet skid resistance may be improved. However, since the silica having a hydrophilic surface has a low affinity with rubber in comparison to the carbon black having a hydrophobic surface, dispersibility may be poor, and thus, there is a need to use a separate silane coupling agent for improving the dispersibility or providing coupling between the silica and the rubber.

Accordingly, attempt of introducing a functional group having affinity or reactivity with silica into the terminal of a rubber molecule is being performed, but its effect is insufficient.

Therefore, development of rubber having high affinity with a filler including silica is necessary.

DISCLOSURE OF THE INVENTION

Technical Problem

The present invention has been devised to solve the above-mentioned problems of the conventional technique, and an object of the present invention is to provide a both terminal-modified conjugated diene-based polymer, which includes a functional group derived from a modification polymerization initiator and a functional group derived from a modifier, and has excellent affinity with a filler and improved mechanical properties and viscoelasticity properties.

In addition, another object of the present invention is to provide a method for preparing the modified conjugated diene-based polymer.

Technical Solution

To solve the above-described tasks, there is provided a modified conjugated diene-based polymer including a functional group derived from a compound represented by the following Formula 1 at one terminal, and a functional group derived from a modifier represented by the following Formula 2 at the other terminal:

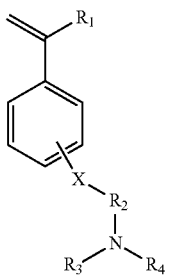

[Formula 1]

in Formula 1, $R_1$ is a hydrogen atom or a monovalent hydrocarbon group of 1 to 20 carbon atoms, $R_2$ is a divalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, $R_3$ and $R_4$ are each independently a monovalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, and X is S or O,

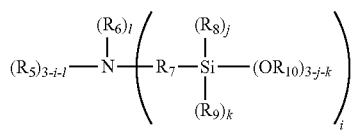

[Formula 2]

in Formula 2, $R_5$ and $R_6$ are each independently a monovalent hydrocarbon group of 1 to 30 carbon atoms or a glycol unit represented by

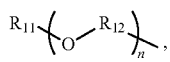

where at least one of $R_5$ and $R_6$ is the glycol unit, $R_7$ is a single bond or a divalent hydrocarbon group of 1 to 30 carbon atoms, $R_8$ to $R_{11}$ are each independently a monovalent hydrocarbon group of 1 to 30 carbon atoms, $R_{12}$ is a divalent hydrocarbon group of 1 to 10 carbon atoms, j and k are each independently 0 or 1, and n is an integer of 1 to 10, where if $R_5$ is the glycol unit, 3-i-l and i are each independently 1 or 2 but are not 2 at the same time, and l is 0 or 1, if $R_6$ is the glycol unit, i and l are each independently 1 or 2 but are not 2 at the same time, and 3-i-l is 0 or 1, and if both $R_5$ and $R_6$ are the glycol units, i is 1 or 2, and l and 3-i-l are each independently 0 or 1 but are not 0 at the same time.

Also, the present invention provides a method for preparing the modified conjugated diene-based polymer which includes the steps of: reacting a compound represented by the following Formula 1 and an organic alkali metal compound in a hydrocarbon solvent to prepare a modification polymerization initiator (step 1); polymerizing a conjugated diene-based monomer or an aromatic vinyl-based monomer and a conjugated diene-based monomer in the presence of the modification polymerization initiator to prepare an active polymer combined with a functional group derived from the compound represented by Formula 1 at one terminal (step 2); and reacting the active polymer with a modifier represented by the following Formula 2 (step 3):

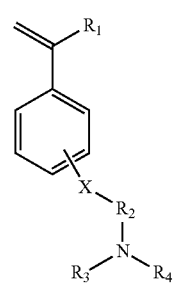

[Formula 1]

in Formula 1, $R_1$ is a hydrogen atom or a monovalent hydrocarbon group of 1 to 20 carbon atoms, $R_2$ is a divalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, $R_3$ and $R_4$ are each independently a monovalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, and X is S or O,

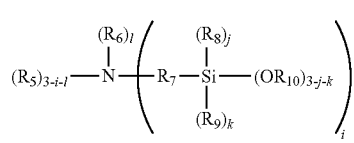

[Formula 2]

in Formula 2, $R_5$ and $R_6$ are each independently a monovalent hydrocarbon group of 1 to 30 carbon atoms or a glycol unit represented by

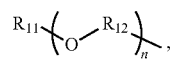

where at least one of $R_5$ and $R_6$ is the glycol unit, $R_7$ is a single bond or a divalent hydrocarbon group of 1 to 30 carbon atoms, $R_8$ to $R_{11}$ are each independently a monovalent hydrocarbon group of 1 to 30 carbon atoms, $R_{12}$ is a divalent hydrocarbon group of 1 to 10 carbon atoms, j and k are each independently 0 or 1, and n is an integer of 1 to 10, where if $R_5$ is the glycol unit, 3-i-l and i are each independently 1 or 2 but are not 2 at the same time, and l is 0 or 1, if $R_6$ is the glycol unit, i and l are each independently 1 or 2 but are not 2 at the same time, and 3-i-l is 0 or 1, and if both $R_5$ and $R_6$ are the glycol units, i is 1 or 2, and l and 3-i-l are each independently 0 or 1 but are not 0 at the same time.

Advantageous Effects

The modified conjugated diene-based polymer according to the present invention includes a functional group derived from a compound represented by Formula 1 at one terminal, and a functional group derived from a modifier represented by Formula 2 at the other terminal, and thus, may have excellent affinity with a filler such as silica and excellent processability, mechanical properties and viscoelasticity.

In addition, in the preparation method according to the present invention, an active polymer is prepared in the presence of a modification polymerization initiator that is prepared using a compound represented by Formula 1, and a functional group derived from the compound represented by Formula 1 may be easily introduced at one terminal of a polymer chain. Also, by reacting the active polymer and the modifier represented by Formula 2, a functional group derived from the modifier represented by Formula 2 may be easily introduced to the other terminal of the polymer chain. As a result, a highly modified conjugated diene-based polymer introducing functional groups at both terminals of a polymer chain may be easily prepared.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl group such as methyl, ethyl, propyl and butyl, and branched alkyl group such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon with one ring, and polycyclic aromatic hydrocarbon with two or more rings.

The term "derived unit" and "derived functional group" used in the present invention may represent a component or a structure comes from a certain material, or the material itself.

The term "monovalent hydrocarbon group" used in the present invention means a monovalent substituent derived from a hydrocarbon group and may mean a monovalent atomic group in which carbon and hydrogen are bonded, such as an alkyl group, an alkenyl group, an alkynyl group, a cycloalkyl group and an aryl group containing an unsaturated bond. The monovalent atomic group may have a linear or branched structure according to the bonding structure thereof.

The term "divalent hydrocarbon group" used in the present invention means a divalent substituent derived from a hydrocarbon group and may mean a divalent atomic group in which carbon and hydrogen are bonded, such as an alkylene group, an alkenylene group, an alkynylene group, a cycloalkylene group and an arylene group containing an unsaturated bond. The divalent atomic group may have a linear or branched structure according to the bonding structure thereof.

The present invention provides a modified conjugated diene-based polymer which introduces functional groups at both terminals of a polymer chain and having excellent affinity with a filler, particularly, a silica-based filler.

The modified conjugated diene-based polymer according to an embodiment of the present invention includes a functional group derived from a compound represented by the following Formula 1 at one terminal, and a functional group derived from a modifier represented by the following Formula 2 at the other terminal:

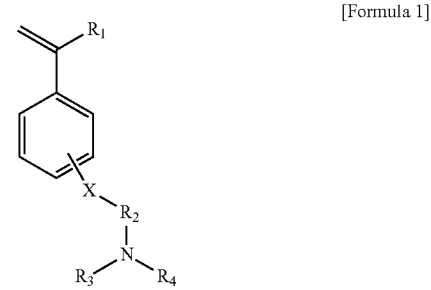

[Formula 1]

in Formula 1, $R_1$ is a hydrogen atom or a monovalent hydrocarbon group of 1 to 20 carbon atoms, $R_2$ is a divalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, $R_3$ and $R_4$ are each independently a monovalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, and X is S or O,

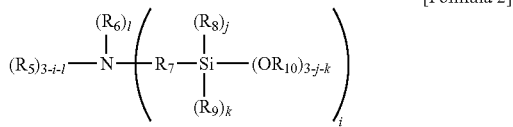

[Formula 2]

in Formula 2, $R_5$ and $R_6$ are each independently a monovalent hydrocarbon group of 1 to 30 carbon atoms or a glycol unit represented by

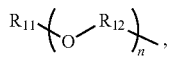

where at least one of $R_5$ and $R_6$ is the glycol unit, $R_7$ is a single bond or a divalent hydrocarbon group of 1 to 30 carbon atoms, $R_8$ to $R_{11}$ are each independently a monovalent hydrocarbon group of 1 to 30 carbon atoms, $R_{12}$ is a divalent hydrocarbon group of 1 to 10 carbon atoms, j and k are each independently 0 or 1, and n is an integer of 1 to 10, where if $R_5$ is the glycol unit, 3-i-l and i are each independently 1 or 2 but are not 2 at the same time, and l is 0 or 1, if $R_6$ is the glycol unit, i and l are each independently 1 or 2 but are not 2 at the same time, and 3-i-l is 0 or 1, and if both $R_5$ and $R_6$ are the glycol units, i is 1 or 2, and l and 3-i-l are each independently 0 or 1 but are not 0 at the same time.

Particularly, in Formula 1, $R_1$ is a hydrogen atom or a monovalent hydrocarbon group of 1 to 20 carbon atoms. If $R_1$ is the monovalent hydrocarbon group of 1 to 20 carbon atoms, $R_1$ may be selected from the group consisting of an alkyl group of 1 to 20 carbon atoms, a cycloalkyl group of 3 to 20 carbon atoms, an aryl group of 6 to 20 carbon atoms, and an arylalkyl group of 7 to 20 carbon atoms. Particularly, $R_1$ may be selected from the group consisting of an alkyl group of 1 to 10 carbon atoms, a cycloalkyl group of 3 to 12 carbon atoms, an aryl group of 6 to 12 carbon atoms and an arylalkyl group of 7 to 12 carbon atoms.

In addition, in Formula 1, $R_2$ may be a divalent hydrocarbon group of 1 to 20 carbon atoms, which is unsubstituted or substituted with a substituent. If $R_2$ is an unsubstituted divalent hydrocarbon group of 1 to 20 carbon atoms, $R_2$ may be an alkylene group of 1 to 20 carbon atoms such as a methylene group, an ethylene group and a propylene group; an arylene group of 6 to 20 carbon atoms such as a phenylene group; or an arylalkylene group of 7 to 20 carbon atoms as the combination group thereof. In addition, if $R_2$ is a substituted divalent hydrocarbon group of 1 to 20 carbon atoms with a substituent, one or more hydrogen atoms bonded to the carbon atoms in the hydrocarbon group may be substituted with substituents. Here, the substituent may be one or more selected from the group consisting of an alkyl group of 1 to 20 carbon atoms, a cycloalkyl group of 3 to 20 carbon atoms, and an aryl group of 6 to 30 carbon atoms, particularly, one or more selected from the group consisting of an alkyl group of 1 to 10 carbon atoms, a cycloalkyl group of 3 to 12 carbon atoms, and an aryl group of 6 to 12 carbon atoms.

Also, in Formula 1, $R_3$ and $R_4$ may be each independently a monovalent hydrocarbon group of 1 to 20 carbon atoms, which is unsubstituted or substituted with a substituent. If $R_3$ and $R_4$ are each independently an unsubstituted monovalent hydrocarbon group of 1 to 20 carbon atoms, $R_3$ and $R_4$ may be selected from the group consisting of an alkyl group of 1 to 20 carbon atoms, a cycloalkyl group of 3 to 20 carbon atoms, an aryl group of 6 to 20 carbon atoms and an arylalkyl group of 7 to 20 carbon atoms, particularly, $R_3$ and $R_4$ may be selected from the group consisting of an alkyl group of 1 to 10 carbon atoms, a cycloalkyl group of 3 to 12 carbon atoms, an aryl group of 6 to 12 carbon atoms and an arylalkyl group of 7 to 12 carbon atoms. In addition, if $R_3$ and $R_4$ are each independently a substituted monovalent hydrocarbon group of 1 to 20 carbon atoms with a substituent, one or more hydrogen atoms bonded to the carbon atoms in the hydrocarbon group may be substituted with substituents. Here, the substituent may be one or more selected from the group consisting of an alkyl group of 1 to 20 carbon atoms, a cycloalkyl group of 3 to 20 carbon atoms, and an aryl group of 6 to 30 carbon atoms, particularly, one or more selected from the group consisting of an alkyl group of 1 to 10 carbon atoms, a cycloalkyl group of 3 to 12 carbon atoms, and an aryl group of 6 to 12 carbon atoms.

More particularly, in Formula 1 in an embodiment of the present invention, $R_1$ may be a hydrogen atom, an alkyl group of 1 to 10 carbon atoms, a cycloalkyl group of 3 to 12 carbon atoms, or an aryl group of 6 to 12 carbon atoms, $R_2$ may be an alkylene group of 1 to 10 carbon atoms, $R_3$ and $R_4$ may be each independently an alkyl group of 1 to 10 carbon atoms, a cycloalkyl group of 3 to 12 carbon atoms, or an aryl group of 6 to 12 carbon atoms, and X may be S or O. More particularly, in Formula 1, $R_1$ may be a hydrogen atom or an alkyl group of 1 to 6 carbon atoms, $R_2$ may be an alkylene group of 1 to 6 carbon atoms, $R_3$ and $R_4$ may be each independently an alkyl group of 1 to 6 carbon atoms, a cycloalkyl group of 3 to 8 carbon atoms, or an aryl group of 6 to 12 carbon atoms, and X may be O.

In addition, in Formula 2, $R_5$ and $R_6$ may be each independently a monovalent hydrocarbon group of 1 to 30 carbon atoms or a glycol unit represented by

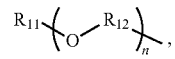

where at least one of $R_5$ and $R_6$ may be the glycol unit. In this case, if $R_5$ is the glycol unit, 3-i-l and i may be each independently 1 or 2 but are not 2 at the same time, and l may be 0 or 1, if $R_6$ is the glycol unit, i and l may be each independently 1 or 2 but are not 2 at the same time, and 3-i-l may be 0 or 1, and if both $R_5$ and $R_6$ are the glycol units, i may be 1 or 2, and l and 3-i-l may be each independently 0 or 1 but may not be 0 at the same time. Here, $R_{11}$ may be a monovalent hydrocarbon group of 1 to 30 carbon atoms, and n may be an integer of 1 to 10.

Particularly, $R_5$ and $R_6$ may be each independently a glycol unit represented by

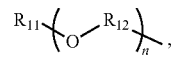

where $R_{11}$ may be an alkyl group of 1 to 10 carbon atoms, and n may be an integer of 2 to 8.

In addition, in Formula 2, $R_7$ may be a single bond or a divalent hydrocarbon group of 1 to 30 carbon atoms. If $R_7$ is a divalent hydrocarbon group, $R_7$ may be an alkylene group of 1 to 20 carbon atoms such as a methylene group, an ethylene group and a propylene group; an arylene group of 6 to 20 carbon atoms such as a phenylene group; or an arylalkylene group of 7 to 20 carbon atoms as the combination group thereof. Particularly, $R_7$ may be an alkylene group of 1 to 10 carbon atoms.

In addition, in Formula 2, $R_8$ to $R_{10}$ may be each independently a monovalent hydrocarbon group of 1 to 30 carbon atoms, particularly, may be one selected from the group consisting of an alkyl group of 1 to 20 carbon atoms, a cycloalkyl group of 3 to 20 carbon atoms, an aryl group of 6 to 20 carbon atoms and an arylalkyl group of 7 to 20 carbon atoms, more particularly, may be each independently an alkyl group of 1 to 10 carbon atoms.

In addition, in Formula 2, $R_{12}$ may be a divalent hydrocarbon group of 1 to 10 carbon atoms, particularly, may be an alkylene group of 2 to 6 carbon atoms.

More particularly, in Formula 2 of an embodiment of the present invention, $R_5$ and $R_6$ may be glycol units represented by

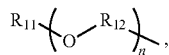

$R_7$ may be an alkylene group of 1 to 10 carbon atoms, $R_8$ to $R_{11}$ may be each independently an alkyl group of 1 to 10 carbon atoms, $R_{12}$ may be an alkylene group of 2 to 6 carbon atoms, i may be an integer of 1 or 2, 3-i-l and l may be each independently an integer of 0 or 1 but not 0 at the same time, and n may be an integer of 2 to 8.

More particularly, in an embodiment of the present invention, the compound represented by Formula 1 may be a compound represented by the following Formula 1-1:

[Formula 1-1]

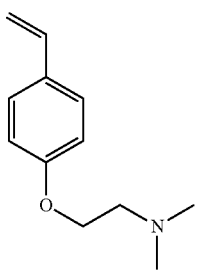

In addition, in an embodiment of the present invention, the modifier represented by Formula 2 may be N,N-bis(3-(triethoxysilyl)propyl)-2,5,8,11,14-pentaoxyhexadecane-16-amine, N,N-bis(3-(diethoxy(methyl)silyl)propyl)-2,5,8,11,14-pentaoxyhexadecane-16-amine, N,N-bis(2-(2-(2-methoxyethoxy)ethoxy)ethyl)-3-(triethoxysilyl)propane-1-amine, N,N-bis(2-(2-(2-butoxyethoxy)ethoxy)ethyl)-3-(triethoxysilyl)propane-1-amine, N,N-bis(3-(triethoxysilyl)propyl)-3,6,9,12,15-pentaoxanonadecane-1-amine, N-(2-(2-(2-methoxyethoxy)ethoxy)ethyl)-3-(triethoxysilyl)-N-(3-(triethoxysilyl)propyl)propane-1-amine, N-(2-(2-(2-methoxyethoxy)ethoxy)ethyl)-N-(3-(trimethoxysilyl)propyl)butane-1-amine, N-(3,6,9,12-tetraoxahexadecyl)-N-(3-(triethoxysilyl)propyl)-3,6,9,12-tetraoxahexadecane-1-amine, N-(3,6,9,12,15-pentaoxanonadecyl)-N-(3-(triethoxysilyl)propyl)-3,6,9,12,15-pentaoxanonadecane-1-amine, or N,N-bis(3-(triethoxysilyl)propyl)-3,6,9,12,15,18-hexaoxodocosane-1-amine.

The modified conjugated diene-based polymer according to the present invention may be prepared by the preparation method described later, for example, a modified polymer of a single polymer of a conjugated diene-based monomer or a copolymer of a conjugated diene-based monomer and an aromatic vinyl-based monomer. In this case, the copolymer may be a random copolymer.

Here, the term "random copolymer" may represent the random arrangement of modification constituent units which form a copolymer.

The modified conjugated diene-based polymer according to an embodiment of the present invention may include a tertiary amine group that is a functional group derived from a compound represented by Formula 1 at one terminal, and a tertiary amine group, an alkylene glycol group and an alkoxysilane group, that is functional groups derived from a modifier represented by Formula 2, at the other terminal. The tertiary amine group may inhibit the hydrogen bond between hydroxyl groups present at the surface of a filler to prevent the agglomeration of the filler and improve the dispersibility of the filler. In addition, the alkylene glycol group may increase the affinity of a polymer chain with a filler and may improve the processability of a polymer, and the alkoxysilane group may make a condensation reaction with the functional group at the surface of the filler, for example, if the filler is silica, with a silanol group at the surface of the silica, to improve abrasion resistance and processability.

Accordingly, the modified conjugated diene-based polymer according to an embodiment of the present invention includes a functional group derived from a compound represented by Formula 1 and a functional group derived from a modifier represented by Formula 2, and may have excellent affinity with a filler, particularly, silica, and thus, may have excellent compounding properties with a filler and improve the processability of a rubber composition including the modified conjugated diene-based polymer. As a result, the tensile strength, abrasion resistance and viscoelasticity properties of a molded article manufactured using the rubber composition, for example, a tire, may be improved.

In addition, the modified conjugated diene-based polymer may have a number average molecular weight (Mn) of 100,000 g/mol to 1,000,000 g/mol, particularly, 400,000 g/mol to 700,000 g/mol.

In addition, the modified conjugated diene-based polymer may have a weight average molecular weight (Mw) of 200,000 g/mol to 1,500,000 g/mol, particularly, 500,000 g/mol to 1,200,000 g/mol.

In addition, the modified conjugated diene-based polymer may have molecular weight distribution (Mw/Mn) of 1.0 to 3.0. Particularly, the molecular weight distribution may be 1.0 to 2.0.

Also, considering the favorable improving effect of the mechanical properties, elastic modulus and processability of a rubber composition in case where applied to the rubber composition, the modified conjugated diene-based polymer according to an embodiment of the present invention may satisfy the above-mentioned molecular weight distribution range and the ranges of the weight average molecular weight and the number average molecular weight at the same time.

Particularly, the modified conjugated diene-based polymer may have molecular weight distribution of 3.0 or less, a weight average molecular weight of 200,000 g/mol to 1,500,000 g/mol, and a number average molecular weight of 100,000 g/mol to 1,000,000 g/mol, and more particularly, may have polydispersity of 2.0 or less, a weight average molecular weight of 500,000 g/mol to 1,200,000 g/mol, and a number average molecular weight of 400,000 g/mol to 700,000 g/mol.

Here, each of the weight average molecular weight and the number average molecular weight is a conversion molecular weight with polystyrene standard, analyzed by gel permeation chromatography (GPC), the molecular weight distribution (Mw/Mn) is also called as polydispersity and is calculated as the ratio (Mw/Mn) of the weight average molecular weight (Mw) and the number average molecular weight (Mn).

In addition, the modified conjugated diene-based polymer may have the vinyl content of 5 wt % or more, particularly, 10 wt % or more, more particularly, 10 wt % to 50 wt %. If the vinyl content is in the above-mentioned range, the glass transition temperature may be controlled to an appropriate range, and if applied to tires, physical properties required for tires such as rolling resistance and braking force may be excellent and a fuel consumption ratio may be decreased.

In this case, the vinyl content means not 1,4-added but 1,2-added conjugated diene-based monomer content with respect to 100 wt % of a conjugated diene-based polymer constituted with a monomer having a vinyl group or a conjugated diene-based monomer.

In addition, the modified conjugated diene-based polymer according to an embodiment of the present invention may be a polymer having high linearity of a −stress/relaxation (S/R) value of 0.7 or more at 100° C. In this case, −S/R represents stress change which is shown as the response to the same amount of strain generated in a material, and is an index representing the linearity of a polymer. Generally, if a −S/R value is small, the linearity of a polymer is low, and if the linearity is decreased, rolling resistance or rotation resistance may increase if applied to a rubber composition. In addition, from the −S/R value, the degree of branch of a polymer and molecular weight distribution may be expected, and if the −S/R value is decreased, the degree of branching is increased, and molecular weight distribution is enlarged, and as a result, the processability of a polymer is excellent, but mechanical properties are degraded.

The modified conjugated diene-based polymer according to an embodiment of the present invention has a high −S/R value of 0.7 or more at 100° C. as described above, and if applied to a rubber composition, resistance properties and fuel consumption properties may be excellent. Particularly, the −S/R value of the modified conjugated diene-based polymer may be 0.7 to 1.2.

Here, the −S/R value was, for example, measured under conditions of 100° C. and rotor speed of 2±0.02 rpm using a Large Rotor of a mooney viscosity system, for example, MV2000E of Monsanto Co. Particularly, a polymer was stood at room temperature (23±5° C.) for 30 minutes or more, and 27±3 g of the polymer was collected and put in a die cavity, and then, platen was operated and measurement was carried out while applying torque. Then, −S/R value was obtained by measuring a grade value of mooney viscosity change shown during untying torque for additional 1 minute.

In addition, the present invention provides a method for preparing the modified conjugated diene-based polymer.

The preparation method according to an embodiment of the present invention is characterized in including the steps of: reacting a compound represented by the following Formula 1 and an organic alkali metal compound in a hydrocarbon solvent to prepare a modification polymerization initiator (step 1); polymerizing a conjugated diene-based monomer, or an aromatic vinyl-based monomer and a conjugated diene-based monomer in the presence of the modification polymerization initiator to prepare an active polymer combined with a functional group derived from the compound represented by Formula 1 at one terminal (step 2); and reacting the active polymer with a modifier represented by the following Formula 2 (step 3):

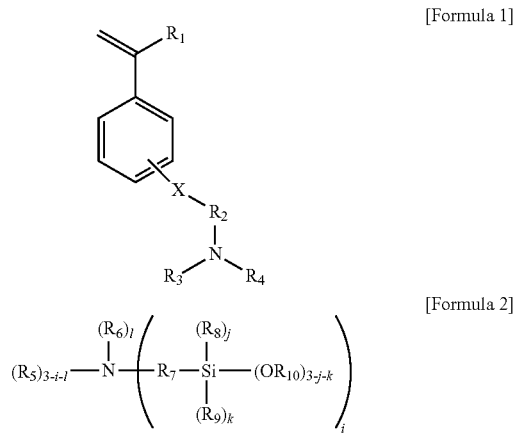

In Formula 1 and Formula 2, $R_1$ to $R_4$, $R_5$ to $R_{10}$, 3-i-l, i, l, j and k are the same as defined referring to the modified conjugated diene-based polymer.

Step 1 is a step for preparing a modification polymerization initiator including a derived unit from the compound represented by Formula 1, and may be performed by reacting the compound represented by Formula 1 and an organic alkali metal compound in a hydrocarbon solvent.

In this case, the compound represented by Formula 1 and the organic alkali metal compound may react in a molar ratio of 1:0.8 to 3. If the compound represented by Formula 1 and the organic alkali metal compound react in the ratio, the derived unit from the compound represented by Formula 1 and the derived unit from the organic alkali metal compound may be easily bonded to form a modification polymerization initiator having optimized performance. In subsequent step 2, an active polymer may be easily formed, and a functional group derived from the compound represented by Formula 1 may be introduced at one terminal of a polymer chain. Here, the bonding may represent the ionic bond of a metal component derived from the organic alkali metal compound with the carbon of the derived unit from the compound represented by Formula 1.

The organic alkali metal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide. Particularly, the organic alkali metal compound may be n-butyllithium.

The hydrocarbon solvent is not specifically limited but may be, for example, one or more selected from the group consisting of n-pentane, n-hexane, n-heptane, isooctane, cyclohexane, toluene, benzene and xylene.

Meanwhile, during reacting the compound represented by Formula 1 with the organic alkali metal compound, a polar solvent may be added as necessary. In this case, if the polar solvent is added, the polar solvent may be used in an equivalent of 0.5 equivalents to 1.1 equivalents with respect to 1 equivalent of the organic alkali metal compound. In addition, the polar solvent is not specifically limited but may be, for example, one or more selected from the group consisting of trimethylamine, triethylamine, tripropylamine and tetramethylethylenediamine, particularly, tetramethylethylenediamine.

In addition, the reaction in step 1 may be performed at 50° C. to 70° C. for 20 minutes to 30 minutes.

Step 2 is a step for preparing an active polymer to which a functional group derived from the compound represented by Formula 1 is introduced at one terminal, and may be performed by polymerizing a conjugated diene-based monomer, or an aromatic vinyl-based monomer and a conjugated diene-based monomer in the presence of the modification polymerization initiator prepared in step 1.

The conjugated diene-based monomer is not specifically limited but may be, for example, one or more selected from the group consisting of 1,3-butadiene, 2,3-dimethyl-1,3-butadiene, piperylene, 3-butyl-1,3-octadiene, isoprene, and 2-phenyl-1,3-butadiene.

In case where a conjugated diene-based monomer and an aromatic vinyl-based monomer are used together as the monomers, the conjugated diene-based monomer may be used at an amount such that the derived unit from the conjugated diene-based monomer in the finally prepared modified conjugated diene-based polymer is included in an amount of 60 wt % or more, particularly, from 60 wt % to less than 100 wt %, more particularly, from 60 wt % to 85 wt %.

The aromatic vinyl monomer is not specifically limited, but may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In case where a conjugated diene-based monomer and an aromatic vinyl-based monomer are used together as the monomers, the aromatic vinyl-based monomer may be used at an amount such that the derived unit from the aromatic vinyl-based monomer in the finally prepared modified conjugated diene-based polymer is included in an amount of 40 wt % or less, particularly, from 40 wt % to greater than 0 wt %, more particularly, from 15 wt % to 40 wt %.

The modification polymerization initiator may be used in an amount of 0.05 parts by weight to 0.3 parts by weight based on total 100 g of the monomer.

The polymerization in step 2 may be performed by adding a polar additive as necessary, and the polar additive may be added in an amount of 0.001 parts by weight to 10 parts by weight based on total 100 parts by weight of the monomer. Particularly, the polar additive may be added in an amount of 0.001 parts by weight to 1 part by weight, more particularly, 0.005 parts by weight to 0.2 parts by weight based on total 100 parts by weight of the monomer.

The polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxyethane, bis(3-dimethylaminoethyl) ether, (dimethylaminoethyl) ethyl ether, trimethylamine, triethylamine, tripropylamine, and tetramethylethylenediamine.

By using the polar additive in the preparation method according to an embodiment of the present invention, the reaction rate difference may be compensated in the copolymerization of the conjugated diene-based monomer and the aromatic vinyl-based monomer, and a random copolymer may be easily formed.

In addition, the polymerization of step 2 may be a polymerization with heating, an isothermal polymerization, or a polymerization at a constant temperature (adiabatic polymerization).

Here, the polymerization at a constant temperature means a polymerization method including a step of polymerizing using self-generated heat of reaction without optionally applying heat after initiating polymerization, and the polymerization with heating means a polymerization method including increasing the temperature by optionally applying heat after the initiation of the polymerization. The isothermal polymerization means a polymerization method by which the temperature of a polymer is kept constant by increasing heat by applying heat or taking heat after initiating the polymerization.

The polymerization may be performed in a temperature range of –20° C. to 200° C., particularly, 20° C. to 150° C., more particularly, 30° C. to 120° C. for 15 minutes to 3 hours. If the polymerization is performed in the above-mentioned temperature range, the control of polymerization reaction is easy, and the rate and efficiency of polymerization reaction may be excellent.

Step 3 is a step for preparing a modified conjugated diene-based polymer and may be performed by reacting the active polymer and the modifier represented by Formula 2. In this case, step 3 may be a modification reaction step.

Particularly, the modifier represented by Formula 2 may be used in a ratio of 0.8 mol to 1.5 mol with respect to 1 mol of the modification polymerization initiator.

If the modifier is used in an amount in the ratio range, modification reaction with optimized performance may be performed and a conjugated diene-based polymer having a high modification ratio may be obtained.

The reaction of step 3 according to an embodiment of the present invention is a modification reaction for introducing a functional group into a polymer, and the reaction may be performed in a temperature range of 10° C. to 120° C. for 10 minutes to 5 hours.

In addition, the preparation method of the modified conjugated diene-based polymer according to an embodiment of the present invention may be performed by a batch type polymerization method or a continuous polymerization method including one or more reactors.

After finishing the modification reaction, ethylene, an isopropanol solution, or the like may be added to a polymerization reaction system to quench the polymerization reaction. Then, through desolvation treatment such as steam stripping lowering the partial pressure of a solvent through the supply of vapor or vacuum drying treatment, a modified conjugated diene-based polymer may be obtained. In addition, in the reaction product obtained as the result of the modification reaction, unmodified active polymer may be included together with the modified conjugated diene polymer.

The preparation method according to an embodiment of the present invention may further include one or more post-process steps among recovering and drying of a solvent and unreacted monomer as necessary after step 3. The post-process step may be performed by, for example, putting the reaction product in hot water heated by steam, stirring to remove solvent, and roll drying to remove remaining solvent and water.

Also, there is provided in the present invention, a rubber composition including the modified conjugated diene-based polymer, and a molded article manufactured from the rubber composition.

The rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, the improving effect of abrasion resistance and cracking resistance of the molded article finally manufactured using the rubber composition, for example, tires, may be insignificant.

In addition, the rubber composition may further include other rubber components, as necessary, in addition to the modified conjugated diene-based polymer, and in this case, the rubber component may be included in an amount of 90 wt % or less based on the total weight of the rubber composition.

Particularly, the rubber component may be included in an amount of 1 part by weight to 900 parts by weight based on 100 parts by weight of the modified conjugated diene-based copolymer.

The rubber component may be a natural rubber or a synthetic rubber, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture of two or more thereof may be used.

In addition, the rubber composition may include 0.1 parts by weight to 150 parts by weight of a filler based on 100 parts by weight of the modified conjugated diene-based polymer. The filler may be a silica-based filler, carbon black or the combination thereof. Particularly, the filler may be carbon black.

The carbon black filler is not specifically limited but may, for example, have a nitrogen adsorption specific surface area of 20 $m^2/g$ to 250 $m^2/g$ (measured based on $N_2SA$, JIS K 6217-2:2001). Also, the carbon black may have a dibutylphthalate oil absorption (DBP) of 80 cc/100 g to 200 cc/100 g. If the nitrogen adsorption specific surface area of the carbon black is greater than 250 $m^2/g$, the processability of a rubber composition may be deteriorated, and if the nitrogen adsorption specific surface area of the carbon black is less than 20 $m^2/g$, reinforcing performance by the carbon black may be insignificant. In addition, if the DBP oil absorption of the carbon black is greater than 200 cc/100 g, the processability of the rubber composition may be deteriorated, and if the DBP oil absorption of the carbon black is less than 80 cc/100 g, reinforcing performance by the carbon black may be insignificant.

In addition, the silica is not specifically limited, but may include, for example, wet silica (hydrated silica), dry silica (anhydrous silicate), calcium silicate, aluminum silicate or colloid silica. Particularly, the silica may be wet silica which has the most remarkable improving effect of the compatibility effect of destruction characteristics and wet grip. In addition, the silica may have nitrogen absorption specific surface area (nitrogen surface area per gram, $N_2SA$) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area is less than 120 $m^2/g$, the reinforcing performance due to silica may be deteriorated, and if the nitrogen absorption specific surface area is greater than 180 $m^2/g$, the processability of the rubber composition may be deteriorated. In addition, if the CTAB absorption specific surface area is less than 100 $m^2/g$, the reinforcing performance by the silica filler may be deteriorated, and if the CTAB absorption specific surface area is greater than 200 $m^2/g$, the processability of the rubber composition may be deteriorated.

Meanwhile, if the silica is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl) trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified conjugated diene-based polymer in which a functional group having high affinity with silica is introduced into an active part as a rubber component is used, and the mixing amount of a silane coupling agent may be smaller than a common case. Particularly, the silane coupling agent may be used in an amount of 1 part by weight to 20 parts by weight, with respect to 100 parts by weight of a filler, and within this range, effect as a coupling agent may be sufficiently exhibited, and the gelation of the rubber component may be prevented. More particularly, the silane coupling agent may be used in an amount of 5 parts by weight to 15 parts by weight with respect to 100 parts by weight of the silica.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. Within this range, elasticity and strength required for a vulcanized rubber composition may be secured, and at the same time, a low fuel consumption ratio may be achieved.

In addition, the rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited but may particularly use thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight based on 100 parts by weight of the rubber component.

In addition, the process oil acts as a softener in a rubber composition and may include, particularly, a paraffin-based, naphthene-based, or aromatic compound, and more particularly, an aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within this range, the deterioration of tensile strength and low exothermic properties (low fuel consumption ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to mixing prescription. By a vulcanization process after a molding process, a rubber composition having low exothermic properties and good abrasion resistance may be obtained.

Therefore, the rubber composition may be useful to the manufacture of each member for tires such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

The molded article manufactured using the rubber composition may include a tire or a tire tread.

Hereinafter, the present invention will be explained in more detail referring to embodiments and experimental embodiments. However, the following embodiments and experimental embodiments are only for the illustration of the present invention, and the scope of the present invention is not limited thereto.

Preparation Example 1

Preparation of N,N-dimethyl-2-(4-vinylphenoxy)ethan-1-amine

1) Preparation of 4-(2-(dimethylamino)ethoxy)benzaldehyde

Into a 2 L, round-bottom flask, 150 g (1.23 mol) of 4-hydroxybenzaldehyde and dimethylformamide were injected to dissolve the 4-hydroxybenzaldehyde, and then, 600 g (4.34 mol) of potassium carbonate was injected thereto, followed by stirring at 80° C. for 1 hour. After that, 215 g (1.49 mol) of 2-chloro-N,N-dimethylethylamine hydrochloride was slowly added dropwisely and reacted at the same temperature for 15 hours. After finishing the reaction, a solid fraction was removed using a filter, ethyl acetate was added, and the resultant product was washed with a saturated NaCl aqueous solution many times. Then, an organic layer was dried with anhydrous magnesium sulfate, a solid was removed using a filter, and an organic solvent was removed under a reduced pressure to obtain 119 g (yield 50.1%) of 4-(2-(dimethylamino)ethoxy)benzaldehyde as a dark brown liquid phase. The 4-(2-(dimethylamino)ethoxy)benzaldehyde thus obtained was identified by $^1H$ nuclear magnetic resonance spectroscopic spectrum ($^1H$ NMR). Through twice repeated preparation, total 238 g of 4-(2-(dimethylamino)ethoxy)benzaldehyde was obtained.

$^1H$ NMR (500 MHz, $CDCl_3$): δ 9.88 (s, 1H), 7.83-7.81 (d, J=9 Ar—H, 2H), 7.03-7.01 (d, J=9 Ar—H, 2H), 4.15-4.13 (t, J=5.75, 2H), 2.76-2.74 (t, J=5.75, 2H), 2.34 (s, 6H).

2) Preparation of N,N-dimethyl-2-(4-vinylphenoxy)ethan-1-amine

Into a 2 L, round-bottom flask, 300 g (0.84 mol) of methyl triphenylphosphonium bromide, and tetrahydrofuran (THF) were injected, and 190 g (1.69 mol) of potassium t-butoxide was dropwisely injected thereto in an ice bath. Stirring was performed at room temperature for 30 minutes, and 130 g (0.67 mol) of 4-(2-(dimethylamino)ethoxy)benzaldehyde prepared in 1) above was dissolved in THF and slowly added thereto dropwisely, followed by reacting at room temperature for 3 hours. After finishing the reaction, THF was distilled under a reduced pressure, water was injected, and extraction with methylene chloride was performed. An organic layer was dried with anhydrous magnesium sulfate, and a solid was removed using a filter. After removing an organic solvent, distillation under a reduced pressure was performed to obtain 110 g (85.5%) of N,N-dimethyl-2-(4-vinylphenoxy)ethan-1-amine as a pale yellow liquid phase. The N,N-dimethyl-2-(4-vinylphenoxy)ethan-1-amine thus obtained was identified by $^1H$ nuclear magnetic resonance spectroscopic spectrum ($^1H$ NMR).

$^1H$ NMR (500 MHz, $CDCl_3$): δ 7.33-7.31 (d, J=8.5, 2H), 6.87-6.86 (d, J=8.5, 2H), 6.67-6.61 (q, J=9.5, 1H), 5.61-5.57 (d, J=17.5, 1H), 5.12-5.01 (d, J=11, 1H), 4.05-4.03 (t, J=5.75, 2H), 2.71-2.69 (t, J=5.75, 2H), 2.32 (s, 6H).

Preparation Example 2

Preparation of N,N-dimethyl-3-(4-vinylphenoxy)propan-1-amine

1) Preparation of 4-(3-(dimethylamino)propoxy)benzaldehyde

Into a 2 L, round-bottom flask, 120 g (0.98 mol) of 4-hydroxybenzaldehyde and dimethylformamide were injected to dissolve the 4-hydroxybenzaldehyde, and then, 410 g (2.96 mol) of potassium carbonate was injected thereto, followed by stirring at 80° C. for 1 hour. After that, 185 g (1.17 mol) of 3-chloro-N,N-dimethylpropylamine hydrochloride was slowly added dropwisely and reacted at the same temperature for 15 hours. After finishing the reaction, a solid fraction was removed using a filter, ethyl acetate was added, and the resultant product was washed with a saturated NaCl aqueous solution many times. Then, an organic layer was dried with anhydrous magnesium sulfate, a solid was removed using a filter, and an organic solvent was removed under a reduced pressure to obtain 140 g (yield 68.7%) of 4-(3-(dimethylamino)propoxy)benzaldehyde as a dark brown liquid phase. The 4-(3-(dimethylamino)propoxy)benzaldehyde thus obtained was identified by $^1$H nuclear magnetic resonance spectroscopic spectrum ($^1$H NMR). Through twice repeated preparation, total 280 g of 4-(3-(dimethylamino)propoxy)benzaldehyde was obtained.

$^1$H NMR (500 MHz, CDCl$_3$): δ 9.87 (s, 1H), 7.83-7.81 (d, J=9 Ar—H, 2H), 7.01-6.99 (d, J=8.5 Ar—H, 2H), 4.11-4.09 (t, J=6.5, 2H), 2.46-2.43 (t, J=7, 2H), 2.25 (s, 6H), 2.00-1.95 (m, 2H).

2) Preparation of N,N-dimethyl-3-(4-vinylphenoxy)propane-1-amine

Into a 2 L, round-bottom flask, 330 g (0.92 mol) of methyl triphenylphosphonium bromide, and tetrahydrofuran (THF) were injected, and 220 g (1.96 mol) of potassium t-butoxide was dropwisely injected thereto in an ice bath. Stirring was performed at room temperature for 30 minutes, and 157 g (0.76 mol) of 4-(3-(dimethylamino)propoxy)benzaldehyde prepared in 1) above was dissolved in THF and slowly added thereto dropwisely, followed by reacting at room temperature for 3 hours. After finishing the reaction, THF was distilled under a reduced pressure, water was injected, and extraction with methylene chloride was performed. An organic layer was dried with anhydrous magnesium sulfate, and a solid was removed using a filter. After removing organic solvents, distillation under a reduced pressure was performed to obtain 125 g (80.4%) of N,N-dimethyl-3-(4-vinylphenoxy)propan-1-amine as a clear liquid phase. The N,N-dimethyl-3-(4-vinylphenoxy)propane-1-amine thus obtained was identified by $^1$H nuclear magnetic resonance spectroscopic spectrum ($^1$H NMR).

$^1$H NMR (500 MHz, CDCl$_3$): δ 7.33-7.32 (d, J=8.5, 2H), 6.87-6.85 (d, J=9, 2H), 6.68-6.62 (q, J=9.5, 1H), 5.61-5.58 (d, J=17.5, 1H), 5.12-5.10 (d, J=11, 1H), 4.03-4.00 (t, J=6.25, 2H), 2.45-2.42 (t, J=7.75, 2H), 2.25 (s, 6H), 1.96-1.93 (t, J=7, 2H).

Preparation Example 3

Preparation of N,N-diethyl-2-(4-vinylphenoxy)ethan-1-amine

1) Preparation of 4-(2-(diethylamino)ethoxy)benzaldehyde

Into a 2 L, round-bottom flask, 130 g (1.06 mol) of 4-hydroxybenzaldehyde and dimethylformamide were injected to dissolve the 4-hydroxybenzaldehyde, and then, 450 g (3.25 mol) of potassium carbonate was injected thereto, followed by stirring at 80° C. for 1 hour. After that, 220 g (1.28 mol) of 2-chloro-N,N-diethylethylamine hydrochloride was slowly added dropwisely and reacted at the same temperature for 15 hours. After finishing the reaction, a solid fraction was removed using a filter, ethyl acetate was added, and the resultant product was washed with a saturated NaCl aqueous solution many times. Then, an organic layer was dried with anhydrous magnesium sulfate, a solid was removed using a filter, and an organic solvent was removed under a reduced pressure to obtain 228 g (yield 96.8%) of 4-(2-(diethylamino)ethoxy)benzaldehyde as a dark brown liquid phase. The 4-(2-(diethylamino)ethoxy)benzaldehyde thus obtained was identified by $^1$H nuclear magnetic resonance spectroscopic spectrum ($^1$H NMR).

$^1$H NMR (500 MHz, CDCl$_3$): δ 9.87 (s, 1H), 7.82-7.80 (d, J=8 Ar—H, 2H), 7.00-6.98 (d, J=9 Ar—H, 2H), 4.12-4.10 (t, J=6.25, 2H), 2.78-2.87 (t, J=6.25, 2H), 2.65-2.61 (q, J=7.2, 4H), 1.08-1.05 (t, J=7, 6H).

2) Preparation of N,N-diethyl-2-(4-vinylphenoxy)ethan-1-amine

Into a 2 L, round-bottom flask, 240 g (0.67 mol) of methyl triphenylphosphonium bromide, and tetrahydrofuran (THF) were injected, and 156 g (1.39 mol) of potassium t-butoxide was dropwisely injected thereto in an ice bath. Stirring was performed at room temperature for 30 minutes, and 120 g (0.54 mol) of 4-(2-(diethylamino)ethoxy)benzaldehyde prepared in 1) above was dissolved in THF and slowly added thereto dropwisely, followed by reacting at room temperature for 3 hours. After finishing the reaction, THF was distilled under a reduced pressure, water was injected, and extraction with methylene chloride was performed. An organic layer was dried with anhydrous magnesium sulfate, and a solid was removed using a filter. After removing organic solvents, distillation under a reduced pressure was performed to obtain 98 g (82.4%) of N,N-diethyl-2-(4-vinylphenoxy)ethan-1-amine as a pale yellow liquid phase. The N,N-diethyl-2-(4-vinylphenoxy)ethan-1-amine thus obtained was identified by $^1$H nuclear magnetic resonance spectroscopic spectrum ($^1$H NMR).

$^1$H NMR (500 MHz, CDCl$_3$): δ 7.33-7.32 (d, J=8.5, 2H), 6.86-6.85 (d, J=8.5, 2H), 6.68-6.62 (q, J=9.5, 1H), 5.61-5.58 (d, J=18, 1H), 5.12-5.10 (d, J=10.5, 1H), 4.05-4.04 (t, J=6.5, 2H), 2.87-2.85 (t, J=6.25, 2H), 2.65-2.61 (q, J=7.17, 4H), 1.08-1.05 (t, J=7.25, 6H).

Preparation Example 4

Preparation of N,N-bis(3-(triethoxysilyl)propyl)-3,6,9,12,15-pentaoxanonadecan-1-amine To a reactor, 300 ml of acetonitrile in which 144.03 g (338.32 mmol) of bis(3-(triethoxysilyl)propyl)amine was dissolved, was injected, and 102.7 g (1014.96 mmol) of triethylamine was added thereto and stirred. Then, 200 ml of acetonitrile in which 198.95 g (405.9 mmol) of 3,6,9,12,15-pentaoxanonadecyl 4-methylbenzenesulfonate was dissolved, was added thereto, followed by heating to 80° C. and stirring for 12 hours. Then, a volatile solvent was removed under a reduced pressure, residual materials were extracted with hexane, and hexane was removed under a reduced pressure to obtain 183.40 g (248.5 mmol, yield 73%) of N,N-bis(3-(triethoxysilyl)propyl)-3,6,9,12,15-pentaoxanonadecan-1-amine as a bright yellow oil. The N,N-bis(3-(triethoxysilyl)propyl)-3,6,9,12,15-pentaoxanonadecan-1-amine thus obtained was identified by $^1$H nuclear magnetic resonance spectroscopic spectrum ($^1$H NMR).

$^1$H NMR (500 MHz, CDCl$_3$): δ 3.83-3.79 (q, 12H), 3.65-3.63 (m, 16H), 3.58-3.56 (m, 4H), 3.46-3.43 (t, 2H), 3.08-3.04 (m, 4H), 1.79-1.69 (m, 4H), 1.58-1.53 (m, 2H), 1.39-1.33 (m, 2H), 1.23-1.20 (t, 18H), 0.92-0.89 (t, 3H), 0.60-0.58 (t, 4H).

Comparative Preparation Example 1: Preparation of N,N-dimethyl-4-vinylaniline

Into a 2 L, round-bottom flask, 460 g (1.28 mol) of methyl triphenylphosphonium bromide and tetrahydrofuran (THF) were injected, and 300 g (2.67 mol) of potassium t-butoxide was dropwisely injected thereto in an ice bath. Stirring was performed at room temperature for 30 minutes, and 160 g (1.07 mol) of dimethylaminobenzaldehyde was dissolved in THF and was slowly added thereto dropwisely, followed by reacting at room temperature for 3 hours. After finishing the reaction, THF was distilled under a reduced pressure, water was injected, and extraction with methylene chloride was performed. An organic layer was dried with anhydrous magnesium sulfate, and a solid was removed using a filter.

After removing organic solvents, distillation under a reduced pressure was performed to obtain 144 g (91.2%) of N,N-dimethyl-4-vinylaniline as a clear liquid phase. The N,N-dimethyl-4-vinylaniline thus obtained was identified by $^1$H nuclear magnetic resonance spectroscopic spectrum ($^1$H NMR).

$^1$H NMR (500 MHz, CDCl$_3$): δ 7.27-7.25 (d, J=8.5, 2H), 6.63-6.57 (m, 3H), 5.53-5.49 (d, J=17.5, 1H), 5.00-4.97 (d, J=11, 1H), 2.87 (s, 6H).

Example 1

Into a 20 L autoclave reactor, 2 kg of n-hexane, 2.62 g of N,N-dimethyl-2-(4-vinylphenoxy)ethan-1-amine prepared in Preparation Example 1, 176 g (0.5 wt % in n-hexane) of n-butyllithium, and 1.59 g of tetramethylethylenediamine (TMEDA) were injected, followed by reacting at 60° C. for 30 minutes to prepare a modification polymerization initiator. 3 kg of n-hexane, 270 g of styrene, 710 g of 1,3-butadiene and 1.29 g of 2,2-bis(2-oxoranyl)propane as a polar additive were injected thereto, and the internal temperature of the reactor was elevated to 60° C., and an adiabatic reaction with heating was performed. After about 30 minutes, 20 g of 1,3-butadiene was injected for capping the terminal of a polymer with butadiene. After about 10 minutes, N,N-bis(3-(triethoxysilyl)propyl)-3,6,9,12,15-pentaoxanonadecan-1-amine prepared in Preparation Example 4 was injected as a modifier, followed by reacting for 15 minutes ([DPT]/[act. Li]=1.5:1 molar ratio, [modifier]/[act. Li]=1:1 molar ratio). Then, the reaction was quenched using ethanol, and 33 g of a solution in which 30 wt % of Wingstay K was dissolved in hexane as an antioxidant, was added thereto. The polymer thus obtained was added to hot water heated using steam and stirred to remove solvents, followed by roll drying to remove remaining solvents and water to prepare a modified styrene-butadiene copolymer.

Example 2

A modified styrene-butadiene copolymer was prepared by performing the same method as in Example 1 except for injecting 2.82 g of N,N-dimethyl-2-(4-vinylphenoxy)propan-1-amine prepared Preparation Example 2 instead of N,N-dimethyl-2-(4-vinylphenoxy)ethan-1-amine prepared in Preparation Example 1, in Example 1.

Example 3

A modified styrene-butadiene copolymer was prepared by performing the same method as in Example 1 except for injecting 3.02 g of N,N-diethyl-2-(4-vinylphenoxy)ethan-1-amine prepared Preparation Example 3 instead of N,N-dimethyl-2-(4-vinylphenoxy)ethan-1-amine prepared in Preparation Example 1, in Example 1.

Comparative Example 1

To a 20 L autoclave reactor, 270 g of styrene, 710 g of 1,3-butadiene, 5 kg of n-hexane, and 1.41 g of 2,2-bis(2-oxoranyl)propane as a polar additive were added, and the internal temperature of the reactor was elevated to 60° C. When the internal temperature of the reactor reached 60° C., 96 g (0.5 wt % in n-hexane) of n-butyllithium was injected into the reactor, and an adiabatic reaction with heating was performed ([DTP]/[act. Li]=1.5 molar ratio). After about 30 minutes, 20 g of 1,3-butadiene was injected for capping the terminal of a polymer with butadiene. Then, the reaction was quenched using ethanol, and 33 g of a solution in which 30 wt % of Wingstay K was dissolved in hexane as an antioxidant, was added thereto. The polymer thus obtained was added to hot water heated using steam and stirred to remove solvents, followed by roll drying to remove remaining solvents and water to prepare a styrene-butadiene copolymer.

Comparative Example 2

To a 20 L autoclave reactor, 270 g of styrene, 710 g of 1,3-butadiene, 5 kg of n-hexane, and 1.79 g of 2,2-bis(2-oxoranyl)propane as a polar additive were added, and the internal temperature of the reactor was elevated to 60° C. When the internal temperature of the reactor reached 60° C., 118 g (0.5 wt % in n-hexane) of n-butyllithium was injected into the reactor, and an adiabatic reaction with heating was performed. After about 30 minutes, 20 g of 1,3-butadiene was injected for capping the terminal of a polymer with butadiene. Then, N,N-diethyl-3-(trimethoxysilyl)propan-1-amine was injected as a modifier and reacted for 15 minutes ([DTP]/[act. Li]=1.5:1 molar ratio, [modifier]/[act. Li]=1:1 molar ratio). Then, the reaction was quenched using ethanol, and 33 g of a solution in which 30 wt % of Wingstay K was dissolved in hexane as an antioxidant, was added thereto. The polymer thus obtained was added to hot water heated using steam and stirred to remove solvents, followed by roll drying to remove remaining solvents and water to prepare a modified styrene-butadiene copolymer.

Comparative Example 3

To a 20 L autoclave reactor, 270 g of styrene, 710 g of 1,3-butadiene, 5 kg of n-hexane, and 1.79 g of 2,2-bis(2-oxoranyl)propane as a polar additive were added, and the internal temperature of the reactor was elevated to 60° C. When the internal temperature of the reactor reached 60° C., 118 g (0.5 wt % in n-hexane) of n-butyllithium was injected into the reactor, and an adiabatic reaction with heating was performed. After about 30 minutes, 20 g of 1,3-butadiene was injected for capping the terminal of a polymer with butadiene. Then, N,N-bis(3-(triethoxysilyl)propyl)-3,6,9,12,15-pentaoxanonadecane-1-amine prepared in Preparation Example 4 was injected as a modifier and reacted for 15 minutes ([DTP]/[act. Li]=1.5:1 molar ratio, [modifier]/[act. Li]=1:1 molar ratio). Then, the reaction was quenched using ethanol, and 33 g of a solution in which 30 wt % of Wingstay K was dissolved in hexane as an antioxidant, was added thereto. The polymer thus obtained was added to hot water heated using steam and stirred to remove solvents, followed by roll drying to remove remaining solvents and water to prepare a modified styrene-butadiene copolymer.

Comparative Example 4

A modified styrene-butadiene copolymer was prepared by performing the same method as in Example 1 except for injecting 2.04 g of N,N-dimethyl-4-vinylaniline prepared in Comparative Preparation Example 1 instead of N,N-dimethyl-2-(4-vinylphenoxy)ethan-1-amine prepared in Preparation Example 1, in Example 1.

Experimental Example 1

With respect to each of the modified styrene-butadiene copolymers and styrene-butadiene copolymers, prepared in the Examples and the Comparative Examples, physical properties were measured by the methods described below, and the results are shown in Table 1 below.
1) Vinyl Content of Styrene Derived Unit
The vinyl content of a styrene derived unit (SM) in each copolymer was measured using NMR.
2) Weight Average Molecular Weight (Mw), Number Average Molecular Weight (Mn) and Molecular Weight Distribution
Each polymer was dissolved in tetrahydrofuran (THF) for 30 minutes under conditions of 40° C., and was loaded on and flown through gel permeation chromatography (GPC). In this case, two columns of PLgel Olexis of Polymer Laboratories Co. Ltd. and one column of PLgel mixed-C were used in combination. Newly replaced columns were all mixed bed type columns, and polystyrene was used as a GPC standard material for gel permeation chromatography.
3) Mooney Viscosity (PMV: Polymer MV and −S/R Value)
For each polymer, the mooney viscosity (MV) was measured by using MV2000E (Monsanto Co., Ltd.) using Large Rotor at conditions of a rotor speed of 2±0.02 rpm at 100° C. In this case, a specimen used was stood at room temperature (23±3° C.) for 30 minutes or more, and 27±3 g of the specimen was collected and put in a die cavity, and then, platen was operated and the mooney viscosity was measured while applying torque.
In addition, the change of the mooney viscosity shown while relaxing the torque during measuring the mooney viscosity was observed for 1 minute, and from its grade value, a −S/R value was determined.

As shown in Table 1 above, the modified styrene-butadiene copolymers of the Examples, prepared by using the modification polymerization initiator according to an embodiment of the present invention, were found to have similar microstructures (styrene derived unit and vinyl content) when compared with the unmodified styrene-butadiene copolymer of Comparative Example 1, which was prepared using n-butyllithium as a polymerization initiator. This means that the modification polymerization initiator according to an embodiment of the present invention favorably acted as a polymerization initiator.

Experimental Example 2

Rubber compositions and rubber specimens were manufactured using the modified styrene-butadiene copolymers and styrene-butadiene copolymers, prepared in the Examples and the Comparative Examples, and then, mooney viscosity, tensile properties, viscoelasticity properties, and abrasion resistance were measured, respectively, by the methods described below, and the results are shown in Table 2 below.
Particularly, each rubber specimen was prepared via a mulling process of a first stage mulling and a second stage mulling. In this case, the amounts of materials except for a copolymer were represented based on 100 parts by weight of the copolymer. In the first stage mulling, 137.5 parts by weight of each copolymer, 70 parts by weight of silica, 11.2 parts by weight of bis(3-triethoxysilylpropyl)tetrasulfide as a silane coupling agent, 2 parts by weight of an antiaging agent (TMDQ), 3 parts by weight of zinc oxide (ZnO), 2 parts by weight of stearic acid, 2 parts by weight of an antioxidant, and 1 part by weight of wax were mixed and mulled using a banbury mixer equipped with a temperature controlling apparatus. In this case, the temperature of the mulling apparatus was controlled, and a first compounding mixture was obtained at a discharge temperature of 145° C.-155° C. In the second stage mulling, the first compounding mixture was cooled to room temperature, and 1.75 parts by weight of a rubber accelerator (CZ), 1.5 parts by weight of a sulfur powder, and 2 parts by weight of a vulcanization accelerator were added to the mulling apparatus and mixed at a temperature of 100° C. or less to obtain a second compounding mixture. Then, a curing process was performed at 160° C. for 20 minutes to manufacture each rubber specimen.

TABLE 1

| Division | | Example | | | Comparative Example | | | |
|---|---|---|---|---|---|---|---|---|
| | | 1 | 2 | 3 | 1 Un- | 2 Single | 3 | 4 Both |
| Whether or not modified | | Both terminal-modified | | | modified | terminal-modified | | terminal-modified |
| NMR (wt %) | Styrene derived unit | 27.7 | 27.6 | 27.7 | 27.1 | 27.1 | 27.3 | 27.3 |
| | Vinyl content | 45.1 | 45.1 | 45.0 | 45.3 | 47.2 | 46.0 | 45.2 |
| GPC result | Mn (×10$^5$ g/mol) | 5.90 | 5.81 | 6.01 | 5.44 | 6.07 | 5.95 | 5.95 |
| | Mw (×10$^5$ g/mol) | 9.41 | 9.45 | 9.32 | 6.01 | 9.58 | 9.51 | 9.71 |
| | Mw/Mn | 1.6 | 1.62 | 1.55 | 1.10 | 1.58 | 1.60 | 1.61 |
| PMV (ML1 + 4, @ 100° C.) (MU) | | 85.9 | 86.1 | 85.5 | 82.6 | 84.6 | 84.8 | 86.2 |

1) Mooney Viscosity (CMV: Compound MV)

The mooney viscosity of each second compounding mixture obtained during manufacturing the rubber specimen was measured and processing properties were compared and analyzed. In this case, the lower the measured value of the mooney viscosity was, the better, the processability was.

The mooney viscosity (MV) was measured by using MV2000E (Monsanto Co., Ltd.) using Large Rotor at conditions of a rotor speed of 2±0.02 rpm at 100° C. In this case, a specimen used was stood at room temperature (23±3° C.) for 30 minutes or more, and 27±3 g of the specimen was collected and put in a die cavity, and then, platen was operated and the mooney viscosity was measured while applying torque.

2) Tensile Properties

The tensile properties were measured by manufacturing each specimen for test and measuring tensile strength when cutting and tensile stress when elongating to 300% (300% modulus) of the specimen according to an ASTM 412 tensile test method. Particularly, measurement of tensile properties was performed by using a Universal Test machin 4204 tensile tester (Instron Co., Ltd.) at room temperature at a rate of 50 cm/min to obtain the tensile strength and the tensile stress when elongating to 300%.

3) Viscoelasticity Properties

Viscoelasticity properties were obtained by measuring tan δ while changing deformation at each measurement temperature (0° C. to 70° C.) and a frequency of 10 Hz with a twist mode by using a dynamic mechanical analyzer (TA Co., Ltd.). Tan δ at 0° C. represents wet grip, and tan δ at 60° C. represents a fuel consumption ratio. The measured values were index based on 100 of the measurement value of Comparative Example 1.

4) Abrasion Resistance

By using a DIN abrasion test apparatus, the abrasion resistance was measured by applying a load of 10 N to a rotating drum to which an abrasion paper was attached, moving each rubber specimen to an orthogonal direction to the rotational direction of the drum, and measuring the weight loss by abrasion. The rotational speed of the drum was 40 rpm, and the total movement distance of the specimen after finishing the test was 40 m. If the weight loss decreases, the abrasion resistance becomes better. The measured values were index based on 100 of the measurement value of Comparative Example 1.

TABLE 2

| Division | | Example 1 | Example 2 | Example 3 | Comparative Example 1 | Comparative Example 2 | Comparative Example 3 | Comparative Example 4 |
|---|---|---|---|---|---|---|---|---|
| CMV (ML1 + 4, @ 100° C.) (MU) | | 75.7 | 79.2 | 77.4 | 83.8 | 92.3 | 76.3 | 75.9 |
| Tensile properties | 300% modulus (kgf/cm$^2$) | 136.7 | 133.5 | 137.2 | 114.2 | 123.8 | 122.5 | 135.9 |
| | Tensile strength (kgf/cm$^2$) | 193.1 | 191.5 | 194.2 | 187.3 | 189.2 | 187.6 | 191.8 |
| Viscoelasticity properties | Tan δ at 0° C. | 107 | 106 | 107 | 100 | 103 | 101 | 106 |
| | Tan δ at 60° C. | 127 | 125 | 128 | 100 | 116 | 113 | 121 |
| Abrasion resistance | | 107 | 106 | 109 | 100 | 106 | 104 | 105 |

As shown in Table 2, the rubber specimens manufactured using both terminal-modified styrene-butadiene copolymers of Example 1 to Example 3 according to the embodiments of the present invention were found to generally have excellent tensile properties and compounding processability, and excellent viscoelasticity properties and abrasion resistance when compared with the rubber specimens manufactured using the unmodified or modified styrene-butadiene copolymers of Comparative Example 1 to Comparative Example 4. Particularly, Example 1 to Example 3 were found to show excellent tensile properties and largely improved viscoelasticity properties and abrasion resistance when compared with Comparative Example 1 which was an unmodified styrene-butadiene copolymer. Also, remarkably excellent compounding processability was found to be achieved due to the large decrease of the mooney viscosity (CMV) of the vulcanized compounding mixture.

In addition, Example 1 to Example 3 were found to show excellent tensile properties and abrasion resistance, particularly, largely improved viscoelasticity properties, which are equivalent or better when compared with Comparative Example 2 and Comparative Example 3, which were single terminal styrene-butadiene copolymers.

Also, Example 1 was found to show improved tensile properties and abrasion resistance, particularly, a largely improved Tan δ value at 60° C., which represented a fuel consumption ratio, when compared with Comparative Example 4, which corresponded to both terminal styrene-butadiene copolymer. In this case, the both terminal-modified styrene-butadiene copolymer of Comparative Example 4 was prepared under the same conditions as Example 1 except for using a partially different modification polymerization initiator (prepared using a compound of Formula 1, where X was not present).

The invention claimed is:

1. A modified conjugated diene-based polymer comprising: a functional group derived from a modification polymerization initiator at one terminal, wherein the modification polymerization initiator comprises a derived unit from a compound represented by Formula 1, and
a functional group derived from a modifier represented by Formula 2 at the other terminal:

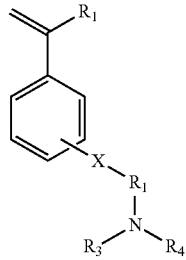

[Formula 1]

wherein in Formula 1,
R$_1$ is a hydrogen atom or a monovalent hydrocarbon group of 1 to 20 carbon atoms,
R$_2$ is a divalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms,
R$_3$ and R$_4$ are each independently a monovalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, and X is S or O,

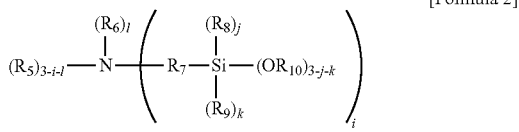

[Formula 2]

wherein in Formula 2, $R_5$ and $R_6$ are each independently a monovalent hydrocarbon group of 1 to 30 carbon atoms or a glycol unit represented by

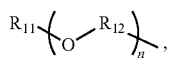

wherein at least one of $R_5$ and $R_6$ is the glycol unit, $R_7$ is a single bond or a divalent hydrocarbon group of 1 to 30 carbon atoms, $R_8$ to $R_{11}$ are each independently a monovalent hydrocarbon group of 1 to 30 carbon atoms, $R_{12}$ is a divalent hydrocarbon group of 1 to 10 carbon atoms, j and k are each independently 0 or 1, and n is an integer of 1 to 10, wherein if $R_5$ is the glycol unit and $R_6$ is the monovalent hydrocarbon group, then i is 1 or 2, and l is 0 or 1, provided that when i is 2, l is 0, if $R_6$ is the glycol unit and $R_5$ is the monovalent hydrocarbon group, then i and l are each independently 1 or 2, provided that i and l are not 2 at the same time, and if both $R_5$ and $R_6$ are the glycol units, then i is 1 or 2, and l is 0 or 1, provided that when i is 1, l is 1.

2. The modified conjugated diene-based polymer of claim 1, wherein
in Formula 1,
$R_1$ is a hydrogen atom, an alkyl group of 1 to 10 carbon atoms, a cycloalkyl group of 3 to 12 carbon atoms, or an aryl group of 6 to 10 carbon atoms,
$R_2$ is a an alkylene group of 1 to 10 carbon atoms, and
$R_3$ and $R_4$ are each independently an alkyl group of 1 to 10 carbon atoms, a cycloalkyl group of 3 to 12 carbon atoms, or an aryl group of 6 to 12 carbon atoms.

3. The modified conjugated diene-based polymer of claim 1, wherein
in Formula 2,
$R_5$ and $R_6$ are glycol units represented by

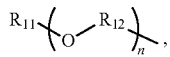

$R_7$ is an alkylene group of 1 to 10 carbon atoms,
$R_8$ to $R_{11}$ are each independently an alkyl group of 1 to 10 carbon atoms,
$R_{12}$ is an alkylene group of 2 to 6 carbon atoms,
i is an integer of 1 or 2,
l is 0 or 1, provided that when i is 1, l is 1, and
n is an integer of 2 to 8.

4. The modified conjugated diene-based polymer of claim 1, wherein the compound represented by Formula 1 is a compound represented by the following Formula 1-1:

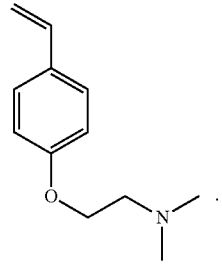

[Formula 1-1]

5. The modified conjugated diene-based polymer of claim 1, wherein the modifier represented by Formula 2 is N,N-bis(3-(triethoxysilyl)propyl)-2,5,8,11,14-pentaoxyhexadecane-16-amine, N,N-bis(3-(diethoxy(methyl)silyl)propyl)-2,5,8,11,14-pentaoxyhexadecane-16-amine, N,N-bis(2-(2-(2-methoxyethoxy)ethoxy)ethyl)-3-(triethoxysilyl)propane-1-amine, N,N-bis(2-(2-(2-butoxyethoxy)ethoxy)ethyl)-3-(triethoxysilyl)propane-1-amine, N,N-bis(3-(triethoxysilyl)propyl)-3,6,9,12,15-pentaoxanonadecane-1-amine, N-(2-(2-(2-methoxyethoxy)ethoxy)ethyl)-3-(triethoxysilyl)-N-(3-(triethoxysilyl)propyl)propane-1-amine, N-(2-(2-(2-methoxyethoxy)ethoxy)ethyl)-N-(3-(trimethoxysilyl)propyl)butane-1-amine, N-(3,6,9,12-tetraoxahexadecyl)-N-(3-(triethoxysilyl)propyl)-3,6,9,12-tetraoxahexadecane-1-amine, N-(3,6,9,12,15-pentaoxanonanedecyl)-N-(3-(triethoxysilyl)propyl)-3,6,9,12,15-pentaoxanonanedecane-1-amine, or N,N-bis(3-(triethoxysilyl)propyl)-3,6,9,12,15,18-hexaoxodocosane-1-amine.

6. The modified conjugated diene-based polymer of claim 1, wherein the modified conjugated diene-based polymer is a single polymer of a conjugated diene-based monomer; or a modified polymer of a copolymer of a conjugated diene-based monomer and an aromatic vinyl-based monomer.

7. The modified conjugated diene-based polymer of claim 1, wherein a number average molecular weight (Mn) of the modified conjugated diene-based polymer is from 100,000 g/mol to 1,000,000 g/mol.

8. The modified conjugated diene-based polymer of claim 1, wherein a molecular weight distribution (Mw/Mn) of the modified conjugated diene-based polymer is from 1.0 to 3.0.

9. A method for preparing the modified conjugated diene-based polymer of claim 1, the method comprising:
1) reacting the compound represented by Formula 1 and an organic alkali metal compound in a hydrocarbon solvent to prepare the modification polymerization initiator;
2) polymerizing a conjugated diene-based monomer or an aromatic vinyl-based monomer and a conjugated diene-based monomer in the presence of the modification polymerization initiator to prepare an active polymer combined with the functional group derived from the modification polymerization initiator at one terminal; and
3) reacting the active polymer with the modifier represented by Formula 2:

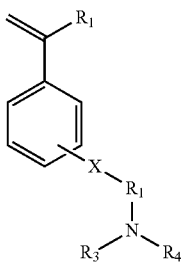

[Formula 1]

wherein Formula 1,
$R_1$ is a hydrogen atom or a monovalent hydrocarbon group of 1 to 20 carbon atoms,
$R_2$ is a divalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms,
$R_3$ and $R_4$ are each independently a monovalent hydrocarbon group of 1 to 20 carbon atoms, which is unsubstituted or substituted with one or more substituents selected from the group consisting of an alkyl group of 1 to 20 carbon atoms, a cycloalkyl group of 3 to 20 carbon atoms, and an aryl group of 6 to 30 carbon atoms, and
X is S or O,

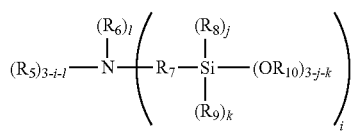

[Formula 2]

wherein Formula 2,
$R_5$ and $R_6$ are each independently a monovalent hydrocarbon group of 1 to 30 carbon atoms or a glycol unit represented by

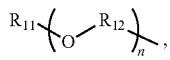

wherein at least one of $R_5$ and $R_6$ is the glycol unit,
$R_7$ is a single bond or a divalent hydrocarbon group of 1 to 30 carbon atoms,
$R_8$ to $R_{11}$ are each independently a monovalent hydrocarbon group of 1 to 30 carbon atoms,
$R_{12}$ is a divalent hydrocarbon group of 1 to 10 carbon atoms,
j and k are each independently 0 or 1, and n is an integer of 1 to 10,
wherein if $R_5$ is the glycol unit and $R_6$ is the monovalent hydrocarbon group, then i is 1 or 2, and l is 0 or 1, provided that when i is 2, l is 0,
if $R_6$ is the glycol unit and $R_5$ is the monovalent hydrocarbon group, then i and l are each independently 1 or 2, provided that i and l are not 2 at the same time, and
if both $R_5$ and $R_6$ are the glycol units, then i is 1 or 2, and l is 0 or 1, provided that when i is 1, l is 1.

10. The method of claim 9, wherein the organic alkali metal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

11. The method of claim 9, wherein the compound represented by Formula 1 and the organic alkali metal compound are reacted in a molar ratio of 1:0.8 to 3.

12. The method of claim 9, wherein the modification polymerization initiator is used in an amount of 0.05 parts by weight to 0.3 parts by weight based on 100 g of the monomers polymerized in step 2).

13. The method of claim 9, wherein the modifier represented by Formula 2 is used in a molar ratio of 0.8 to 1.5 with respect to 1 mol of the modification polymerization initiator.

14. The method of claim 9, wherein the polymerizing in step 2) is performed by adding a polar additive, and
the polar additive is added in an amount of 0.001 parts by weight to 10 parts by weight with respect to 100 parts by weight of the monomers.

15. The modified conjugated diene-based polymer of claim 1, wherein a stress/relaxation (S/R) value of the modified conjugated diene-based polymer is 0.7 or more at 100° C.

16. The method according to claim 14, wherein the polar additive is one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxyethane, bis(3-dimethylaminoethyl) ether, (dimethylaminoethyl) ethyl ether, trimethylamine, triethylamine, tripropylamine, and tetramethylethylenediamine.

17. A rubber composition comprising the modified conjugated diene-based polymer of claim 1 and a filler in an amount of 0.1 parts by weight to 150 parts by weight based on 100 parts by weight the modified conjugated diene-based polymer.

18. The rubber composition of claim 17, wherein the filler is a silica-based filler, carbon black, or a combination thereof.

19. The modified conjugated diene-based polymer of claim 1, wherein
the functional group derived from the modification polymerization initiator at one terminal is a tertiary amine group, and
the functional group derived from a modifier represented by Formula 2 at the other terminal is a tertiary amine group, an alkylene glycol group, or an alkoxysilane group.

* * * * *